United States Patent
Klupar et al.

(10) Patent No.: US 6,779,759 B1
(45) Date of Patent: Aug. 24, 2004

(54) INTEGRATED POWER AND ATTITUDE CONTROL SYSTEM AND METHOD

(75) Inventors: George J. Klupar, Phoenix, AZ (US); Stephen G. Abel, Chandler, AZ (US); Calvin C. Potter, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 34 days.

(21) Appl. No.: 10/402,493

(22) Filed: Mar. 28, 2003

(51) Int. Cl.[7] .............................................. B64G 1/28
(52) U.S. Cl. ..................................... 244/165; 244/172
(58) Field of Search ........................... 244/158 R, 164, 244/165, 172

(56) References Cited

U.S. PATENT DOCUMENTS

| | | | |
|---|---|---|---|
| 3,269,195 A | 8/1966 | Cahoon et al. | 244/165 |
| 3,301,070 A | 1/1967 | LaPierre | 244/165 |
| 3,875,488 A | 4/1975 | Crocker et al. | 244/165 |
| 4,161,116 A | 7/1979 | Fegraus et al. | 244/165 |
| 4,573,651 A * | 3/1986 | Stanton | 244/165 |
| 4,723,735 A | 2/1988 | Eisenhaure et al. | 244/165 |
| 5,921,505 A | 7/1999 | Spector | 244/165 |
| 6,231,011 B1 | 5/2001 | Chu et al. | 244/165 |
| 6,240,337 B1 | 5/2001 | Marr, Jr. et al. | 244/165 |
| 6,305,647 B1 * | 10/2001 | Defendini et al. | 244/165 |
| 6,439,510 B1 | 8/2002 | Barde | 244/165 |

OTHER PUBLICATIONS

Christopher D. Hall, author of "Integrated Spacecraft Power and Attitude Control Systems Using Flywheels", paper from Air Force Institute of Technology, AFIT/ENY/TR–000.

* cited by examiner

*Primary Examiner*—J. Woodrow Eldred
(74) *Attorney, Agent, or Firm*—Douglas A. Mullen, Esq.

(57) ABSTRACT

An integrated power and attitude control system that includes a plurality of flywheels and a controller. The controller receives power commands and attitude commands and determines the optimum set of flywheel acceleration and gimbal velocity commands to supply to each flywheel, to meet the commanded power and attitude. Flywheel rotational acceleration is controlled to provide the commanded power, and both flywheel acceleration and flywheel gimbal angular velocity are controlled to provide the commanded attitude.

13 Claims, 5 Drawing Sheets

INTEGRATED POWER AND ATTITUDE CONTROL SYSTEM AND METHOD

FIELD OF THE INVENTION

The present invention relates to an integrated power and attitude control system and, more particularly, to an integrated power and attitude control system that reduces the likelihood of errors in attitude control that can result from power regulation.

BACKGROUND OF THE INVENTION

Many satellites and other spacecraft, as well as some terrestrial stationary and vehicle applications, such as sea-going vessels, can include one or more energy storage flywheels to provide both a backup power source and to provide attitude control for the vehicle. In such systems, each flywheel is controlled and regulated to balance the electrical demand in the vehicle electrical distribution system, and is also controlled in response to programmed or remote attitude (or torque) commands received by the vehicle main controller. Thus, each flywheel responds to two commands in two distinct parameters, a power command and a torque command. Together, these parameters make up four distinct degrees of freedom. These degrees of freedom are electrical power (e.g., voltage), and momentum about each of three orthogonal axes.

To be controllable, a system needs to have at least as many controllable degrees of freedom as there are uncontrollable degrees of freedom. Flywheels may be implemented in various configurations, which will determine the total number of controllable degrees of freedom for the flywheel. Generally, and as was noted above, the rotational speed of a flywheel provides one degree of freedom, and each flywheel gimbal angle provides another, separate degree of freedom. Thus, for example, a flywheel configured with two gimbals, one gimbal, or no gimbals, will have three, two, or one degree of freedom, respectively.

Some vehicles that have an integrated power and attitude control system include three or more flywheels, each configured with a single gimbal. With this configuration, each flywheel has two controllable degrees of freedom, one degree of freedom for speed and one degree of freedom for gimbal angle. Thus, in a system with three flywheels, six degrees of freedom are available, one gimbal angle and one spin rate for each flywheel. As noted above, for a free-flying spacecraft or some other vehicles, only four controllable degrees of freedom are needed. As a result, the system is overdefined, which means there are multiple solutions for any given command set.

A common control technique for the above-described integrated power and attitude control system configuration is to control all of the flywheels to the same speed, and treat this as a single combined degree of freedom to control the power. The three remaining degrees of freedom are controlled by the gimbal angles of the flywheels. This control technique allows the attitude control loop to operate at a reduced rate, and the power loop to operate at a faster rate, which may be needed to provide voltage stability. However, this control technique does exhibit certain drawbacks, such as introducing "crosstalk errors" from the power loop to the attitude control loop. For example, a change in the rotational speed of a flywheel affects not only the power supplied to or drawn from the flywheel, but the momentum of the flywheel as well. Thus, when power is supplied to or drawn from a flywheel, it can result in generation of an unwanted torque, and a momentary twisting of the vehicle during combined maneuvers and power surges.

Hence, there is a need for an integrated power and attitude control system and control method that does not result in crosstalk errors between power control and attitude control loops, and thus substantially eliminates unwanted torque generation during combined maneuvers and power surges. The present invention addresses this need.

SUMMARY OF THE INVENTION

The present invention provides an integrated power and attitude control system and control method that substantially eliminates unwanted torque generation during combined maneuvers and power surges.

In one embodiment, and by way of example only, an integrated power and attitude control system includes a controller and an energy storage flywheel system. The controller is coupled to receive at least a torque command signal and a power command signal and is operable, in response thereto, to supply (i) a gimbal angular velocity command based at least in part on the torque command signal and (ii) a flywheel acceleration command based at least in part on the torque command signal and the power command signal. The energy storage flywheel system is coupled to receive the gimbal angular velocity command and the flywheel acceleration command from the controller and is operable, in response thereto, to (i) move on a gimbal axis at the commanded gimbal angular velocity and (ii) accelerate on a spin axis at the commanded flywheel acceleration.

In another exemplary embodiment, a method of controlling the relative attitude and rotational speed of a flywheel includes receiving a torque command signal and a power command signal. A gimbal angular velocity command, based at least in part on the torque command, is supplied, and a rotational acceleration command, based at least in part on the torque command signal and the power command signal, is supplied. The flywheel is moved on a gimbal axis at the commanded gimbal angular velocity, and is accelerated on a spin axis at the commanded rotational acceleration.

In yet another exemplary embodiment, a satellite includes a controller and a plurality of flywheel systems. The controller is coupled to receive at least a torque command signal and a power command signal and is operable, in response thereto, to supply (i) one or more independent gimbal angular velocity commands based at least in part on the torque command signal and (ii) one or more independent flywheel acceleration commands based at least in part on the torque command signal and the power command signal. Each of the flywheels is coupled to receive one of the independent gimbal angular velocity commands and one of the independent flywheel acceleration commands from the controller and is operable, in response thereto, to (i) move on a gimbal axis at the commanded gimbal angular velocity it received and (ii) accelerate on a spin axis at the commanded flywheel acceleration it received.

Other independent features and advantages of the preferred integrated power and attitude control system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in a satellite, it will be appreciated that it can be implemented in other systems and environments, both terrestrial and extraterrestrial.

Figure 1:
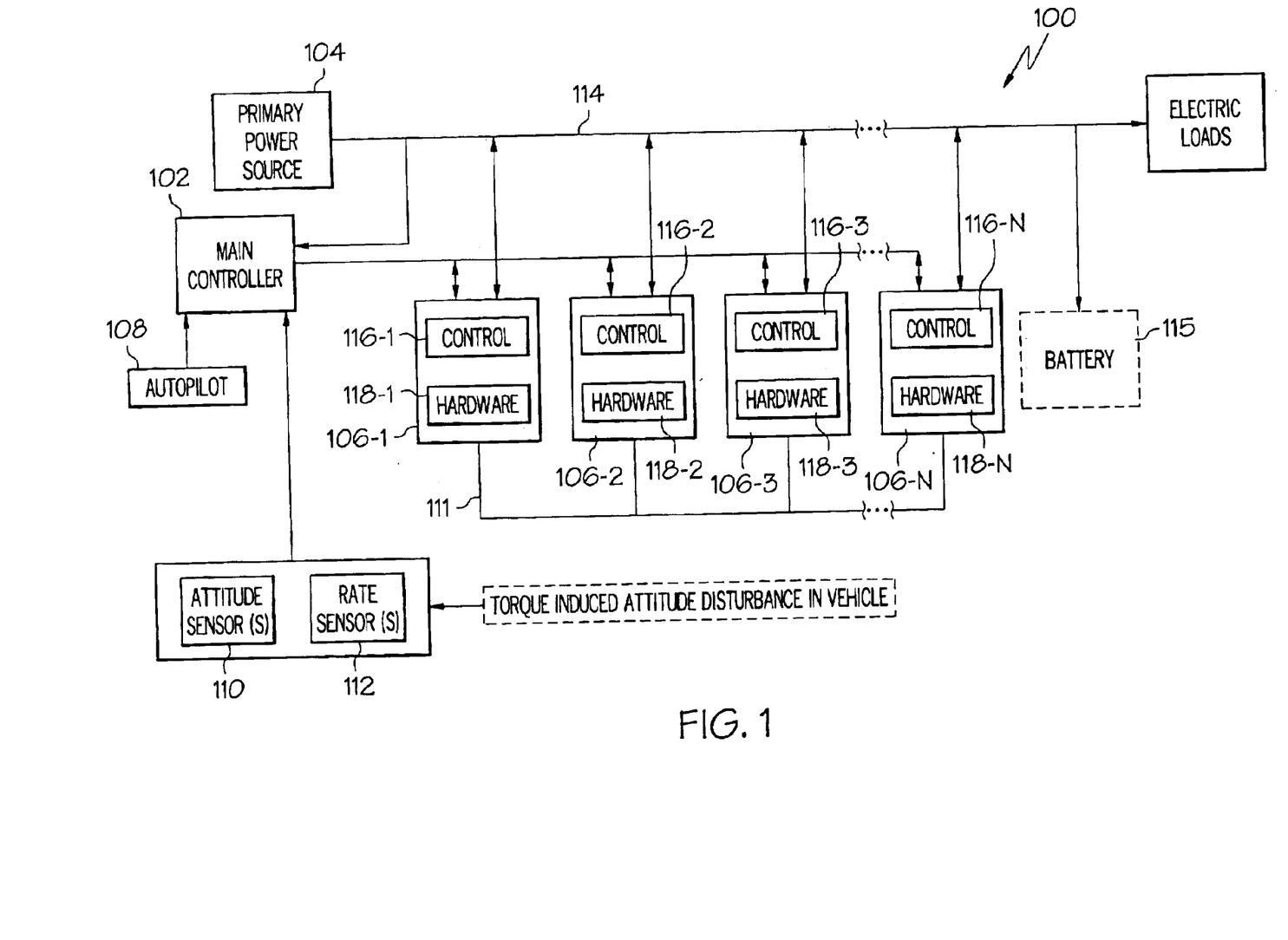
FIG. 1 is a functional block diagram of an exemplary embodiment of a power and attitude control system for a spacecraft.
Figure 2:
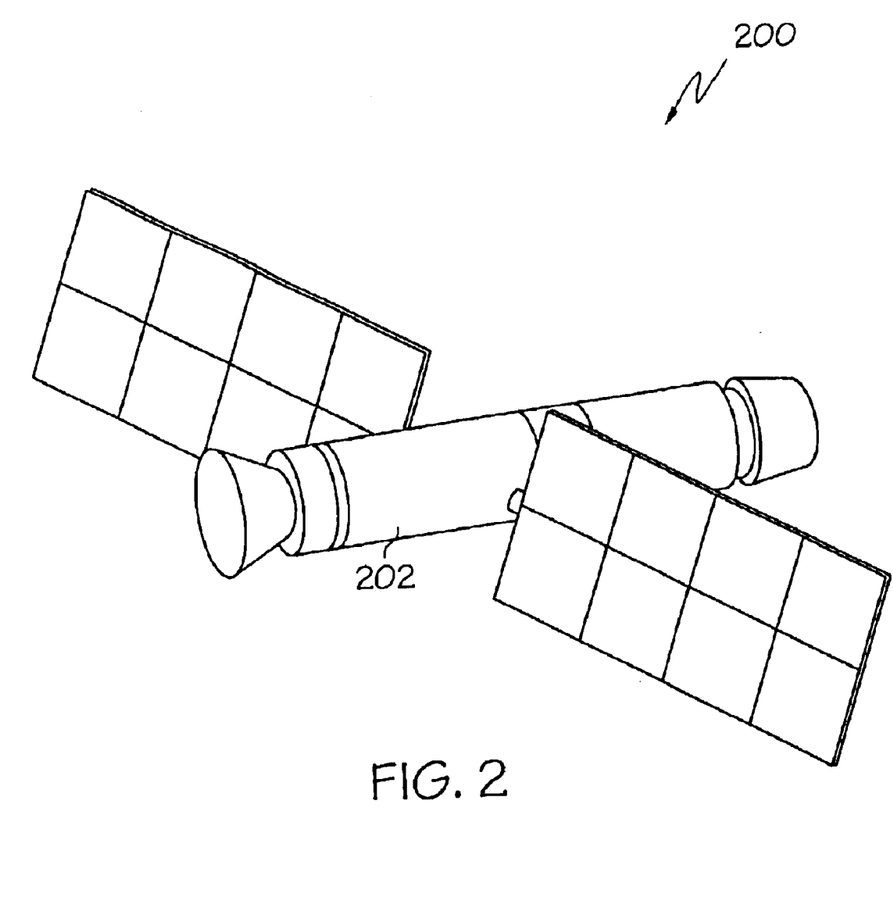
FIG. 2 is a perspective view of a physical embodiment of a satellite system that may incorporate the system of FIG. 1.

Turning now to the description and with reference first to FIG. 1, a functional block diagram of an exemplary power and attitude control system 100 for a spacecraft is shown. The system 100 includes a main controller 102, a primary power source 104, and a plurality of flywheel systems 106 (106-1, 106-2, 106-3, . . . 106-N). A perspective view of an exemplary physical embodiment of a spacecraft 200 that may use the system 100 is illustrated in FIG. 2.

The main controller 102 receives attitude commands (or torque commands) from, for example, an earthbound station or its onboard autopilot 108, and monitors the electrical power distribution system 114, and appropriately controls the operation of the flywheels 106. In response to the torque commands, the flywheels 106 are controlled to induce appropriate attitude disturbances in the spacecraft, and thereby control spacecraft attitude. In addition, depending upon the state of the electrical distribution system 114, the flywheels 106 are controlled to either supply electrical energy to, or draw electrical energy from, the electrical distribution system. One or more spacecraft dynamic sensors, such as one or more attitude sensors 110 and one or more rate sensors 112, sense spacecraft attitude and attitude rate-of-change, respectively, and supply feedback signals representative thereof to the main controller 102. A more detailed description of the main controller 102 and the process it implements to control power and attitude is provided further below.

The primary power source 104, as its name connotes, is the primary source of electrical power to the electrical power distribution system 114. In the depicted embodiment, in which the system 100 is implemented in a spacecraft, the primary power source 104 is one or more solar panels, each of which includes an array of solar cells to convert light energy into electrical energy. The solar panels 104 may be attached to the satellite itself or to fixed or moveable structures that extend from the satellite. When the spacecraft 200 is positioned such that it does not receive sunlight, such as, for example, when it is in the Earth's shadow, a backup electrical power source is needed. As was alluded to above, in addition to providing attitude control, the flywheel systems 106 also function as a backup power source. The flywheel systems 106 may also provide electrical power if the power demanded by the electrical loads exceeds the capacity of the primary power source 104. It will be appreciated that another backup power source, such as a battery 114 (shown in phantom in FIG. 1), may also be provided.

The system 100 includes N number of energy storage flywheel systems 106 (106-1, 106-2, 106-3, . . . 1-6-N). The system 100 is preferably configured so that some of the flywheel systems 106 are active, while one or more of the remaining flywheel systems 106 is in a standby, inactivated state. Thus, the system 100 is at least single fault tolerant. The number of flywheel systems 106 that are active may vary, depending on system requirements. As will be discussed more fully below, in a particular preferred embodiment, four flywheel systems 106 are active and the remaining are inactive.

Figure 3:
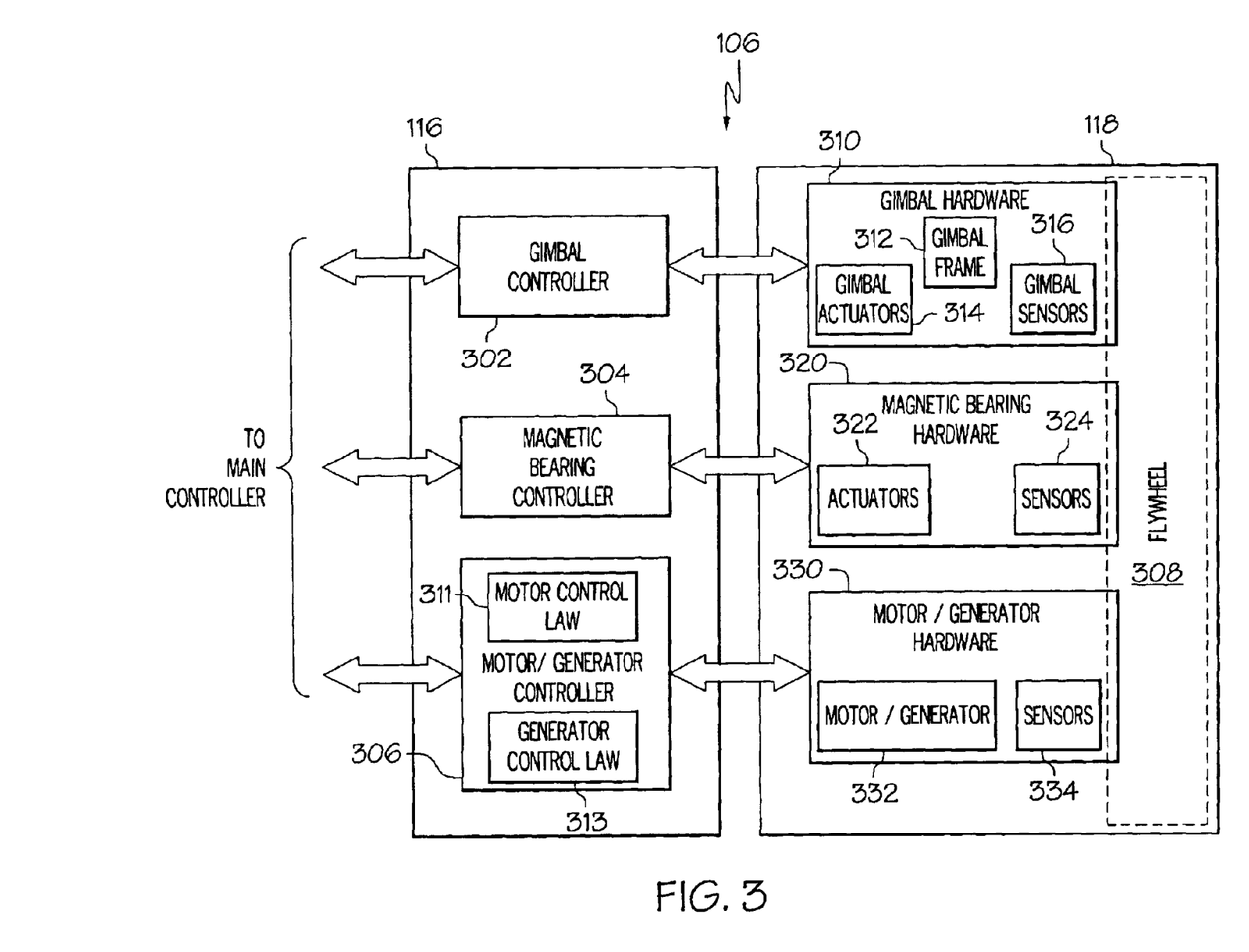
FIG. 3 is a functional block diagram of an exemplary embodiment of one flywheel system that may be used in the system of FIG. 1.

The flywheel systems 106 each include a flywheel control module 116 (116-1, 116-2, 116-3, . . . 116-N) and flywheel hardware 118 (118-1, 118-2, 118-3, . . . 118-N). The flywheel control modules 116 are each in operable communication with the main controller 102 and, in the depicted embodiment, are in communication with one another via a data bus 111. The main controller 102, as was noted above, supplies attitude control commands to the each of the flywheel control modules 116. In turn, the flywheel control modules 116 control the relative attitudes and angular velocities of the associated flywheel hardware 118 to effect attitude control of the spacecraft 200. The flywheel control modules 116 also respond to commands from the main controller 102 to control the operation of the associated flywheel hardware 118 in either a motor mode or a generator mode, and the rotational acceleration of the associated flywheel hardware 118 in each mode. The flywheel control modules 116, as is discussed in more detail below, also monitor various parameters of the associated flywheel hardware 118, and supply representative signals to the main controller 102. A block diagram of an exemplary embodiment one flywheel system 106 is illustrated in FIG. 3, and will now be discussed in detail.

The flywheel control modules 116 each include three separate controllers, a gimbal controller 302, a magnetic bearing controller 304, and a motor/generator controller 306. The flywheel hardware modules 118 each include an energy storage flywheel 308, gimbal hardware 310, magnetic bearing hardware 320, and motor/generator hardware 330. The gimbal controller 302 receives gimbal angle velocity commands from the main controller 102, and supplies appropriate control signals to, and receives various feedback signals from, the gimbal hardware 310, to effect attitude control. At least some of the feedback signals the gimbal controller 310 receives are representative of the gimbal hardware 310 response to the supplied control signals. The gimbal controller 302 also supplies these feedback signals to the main controller 102.

In the depicted embodiment, the gimbal hardware 310 includes a gimbal frame 312, one or more gimbal actuators 314, and one or more gimbal sensors 316. The flywheel 308 is mounted in the gimbal frame 312. The gimbal frame 312 is rotationally mounted about one gimbal axis, which is perpendicular to the spin axis of the energy storage flywheel 308. The gimbal actuators 314 are coupled to the gimbal frame 312, and are also coupled to receive the control signals from the gimbal controller 302. As is generally known, attitude control in a spacecraft may be implemented by changing the gimbal angles at certain rates (e.g., angular velocities). Thus, in response to the commands received from the main controller 102, the gimbal controller 302 supplies appropriate control signals to the gimbal actuators 314. In response to these control signals, the gimbal actuators appropriately position the gimbal frame 312 at the appropriate angular velocities. The gimbal sensors 316 include sensors that can sense at least the position and rate of the gimbal frame 312, and supply position and rate feedback signals to the gimbal controller 302 and to the main controller 102.

The magnetic bearing controller 304 may also receive one or more commands from the main controller 102. The magnetic bearing controller 304, in accordance with a control law, supplies appropriate command signals to, and receives various feedback signals from, the magnetic bearing hardware 320. At least some of the feedback signals received by the magnetic bearing controller 304 are representative of the magnetic bearing hardware 320 response to the supplied control signals. Similar to the gimbal controller 302, the magnetic bearing controller 304 may supply one or more of the feedback signals it receives to the main controller 102.

The magnetic bearing hardware 320 functions to rotationally mount or levitate, in non-contact fashion, the energy storage flywheel 106. In the depicted embodiment, the magnetic bearing hardware 320 implements active magnetic bearings, and includes electromagnetic actuators 322 and position sensors 324. The position sensors 324 sense the position of the flywheel rotor (not illustrated) and supply appropriate position signals to the magnetic bearing controller 304. The magnetic bearing controller 304, in accordance with the control law, supplies the appropriate current magnitude to the electromagnetic actuators 322, which in turn generate magnetic forces of the appropriate magnitude to appropriately position the flywheel rotor. As FIG. 3 also depicts, the magnetic bearing hardware 320 may include one or more temperature sensors 326. Although active magnetic bearings are shown in FIG. 3, it will be appreciated that the magnetic bearing hardware 320 could be configured to implement passive magnetic bearings, or non-magnetic rolling element bearings.

The motor/generator controller 306 receives a signal representative of the bus voltage of the spacecraft electrical distribution system 114 and, in response, configures the motor/generator hardware 330 to operate as either a motor or a generator. The motor/generator controller 302 also receives commands from the main controller 102 and, in response, controls the rotational acceleration of the motor/generator and thus the flywheel 308. To do so, the motor/generator controller 306 is configured to selectively implement either a motor control law 311 or a generator control law 313. The motor/generator controller 306 also receives various feedback signals from the motor/generator hardware 330. At least some of the feedback signals received by the motor/generator controller 306 are representative of the motor/generator hardware 330 response to the supplied control signals. The motor/generator controller 306 supplies one or more of the feedback signals it receives from the motor/generator hardware 330 to the main controller 102.

The motor/generator hardware 330 includes a motor/generator 332 and one or more sensors 334. The motor/generator 332 may be any one of numerous motor/generator sets known now, or in the future, and includes a main rotor that is coupled to the rotor of the flywheel 308. The sensors 334 include one or more temperature sensors and one or more commutation sensors. When the bus voltage of the electrical distribution system 110 is sufficiently high, the motor/generator controller 306 implements the motor control law 311 and the motor/generator 332 is operated as a motor. During operation as a motor, the motor/generator 332 spins up the flywheel 308, to store rotational kinetic energy. Conversely, when the bus voltage of the electrical distribution system 110 drops to some predetermined magnitude, the motor/generator controller 306 implements the generator control law 313 and the motor/generator 332 is operated as a generator. During its operation as a generator, the motor/generator 332 spins down the flywheel 308, converting the flywheel's stored rotational kinetic energy to electrical energy. As was previously discussed, changes in the rotational speed of the flywheel 308 can impact the attitude of the spacecraft. Thus, in both the motor mode and generator mode, the flywheel 308 is spun up, or spun down, to a rotational velocity at an acceleration commanded by the main controller 102

Figure 4:
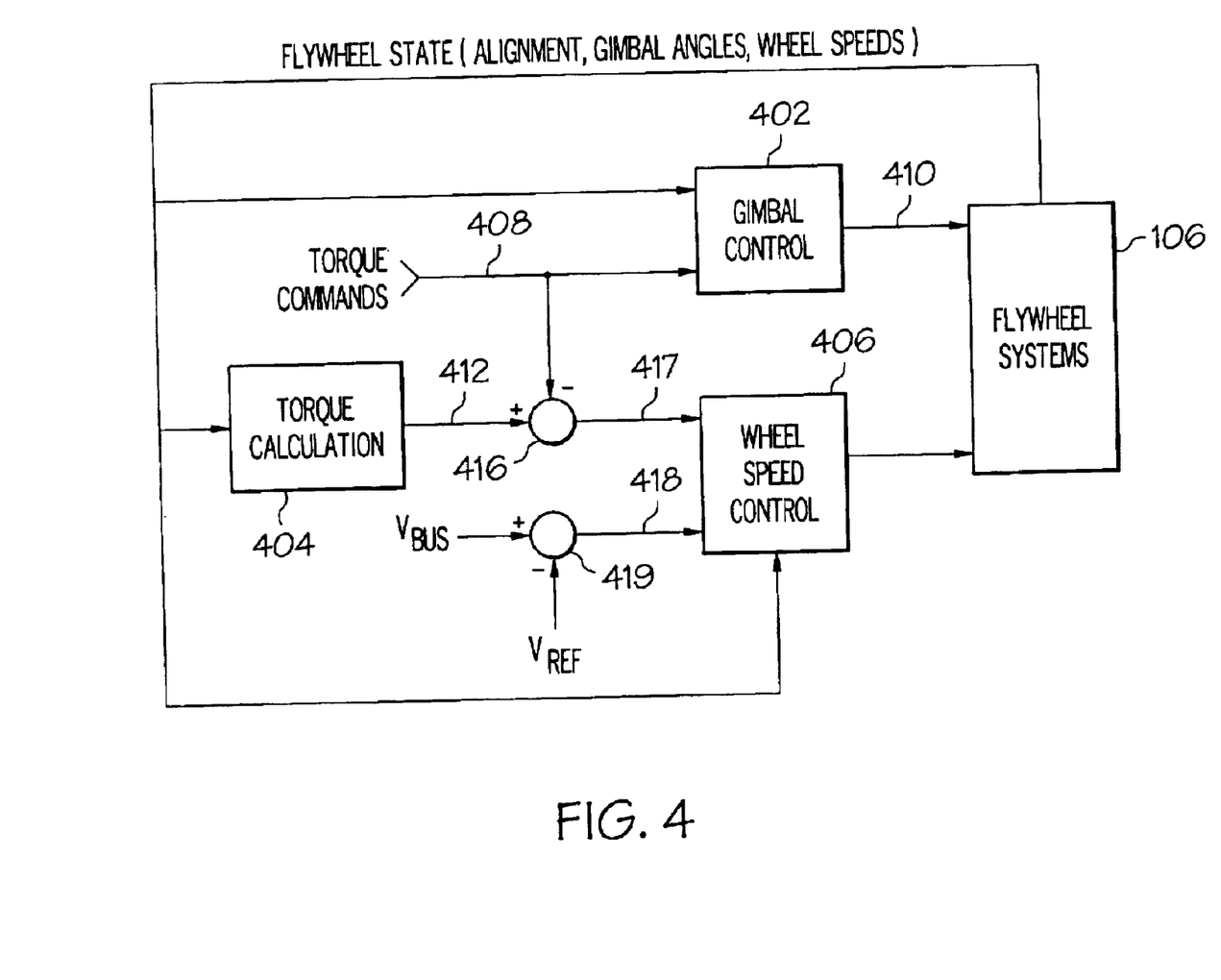
FIG. 4 is a functional block diagram of at least a portion of a controller that is used to implement power and attitude control in the system of FIG. 1.

The main controller 102, as was generally described above, controls the power and attitude of the spacecraft. A detailed description of the main controller 102 and the process it implements to provide this control will now be provided. With reference first to FIG. 4, it is seen that the main controller 102 implements both a gimbal control loop and a speed control loop, and includes a gimbal control block 402, a torque calculation block 404, and a wheel speed control block 406. The gimbal control block 402 receives the torque commands 408 from a remote location or the onboard autopilot 108. In response, the gimbal control block 402 generates the appropriate gimbal angle and gimbal angular velocity commands 410.

The gimbal angle and angular velocity commands 410 generated by the gimbal control block 402 are supplied to the appropriate flywheel system 106, which moves, in response to its supplied command, to the commanded gimbal angle at the commanded gimbal angular velocity. More specifically, in the above described embodiment, the gimbal angular velocity commands 410 are supplied to the gimbal controllers 302 in each flywheel system 106. The gimbal controllers 302 then supply appropriate commands to the associated gimbal actuators 314, which move the associated gimbal frames 312, and thus the associated flywheels 308, to the gimbal angle at the commanded gimbal angular velocity. The gimbal sensors 316 in each flywheel system 106 supply gimbal angular velocity feedback signals to both the gimbal control block 402 and the torque prediction block 404.

The torque calculation block 404 receives the gimbal angular velocity feedback signals from each flywheel system 106. In response, the torque calculation block 404 calculates the instantaneous torques for each flywheel system 106 and supplies signals 412 representative thereof. These calculated torque output signals 412 are then compared to the torque commands 408 in a first comparator 416, and the difference 414 is supplied as a torque control input signal 417 to the wheel speed control block 406. In a particular preferred embodiment, the instantaneous torques are calculated by multiplying the instantaneous gimbal angular velocities fed back from the flywheel systems 106 by flywheel inertia values, which are stored in memory.

The wheel speed control block 406 receives the torque control input signal 417 from the torque prediction block 404, and a power command 418 supplied from a second comparator 419, which compares electrical system bus voltage magnitude ($V_{BUS}$) to a reference voltage magnitude ($V_{REF}$). In response to the torque control input signal 417 and the power command 418, the wheel speed control block 406 generates the appropriate flywheel acceleration commands 420. It will be appreciated that the power command 418 may be converted into an equivalent torque command in either the wheel speed control block 406 or another functional block internal or external to the main controller. This conversion is conventionally known.

The acceleration commands 420 generated by the wheel speed control block 406 are supplied to the appropriate flywheel system 106, which in turn spins up or spins down, as appropriate, to a rotational velocity at the commanded rotational acceleration. More specifically, in the above-described embodiment, the acceleration commands 420 are supplied to the motor/generator controllers 306 in each flywheel system 106. The motor/generator controllers 306 then supply appropriate commands to the associated motor/generators 332 to spin the associated flywheels 308 either up or down to the rotational velocity at the commanded rotational acceleration. It is noted that, whether the wheel is spun up or down depends upon whether the flywheel systems 106 are being used to supply energy or store energy, which in turn depends upon the power command 418.

Figure 5:
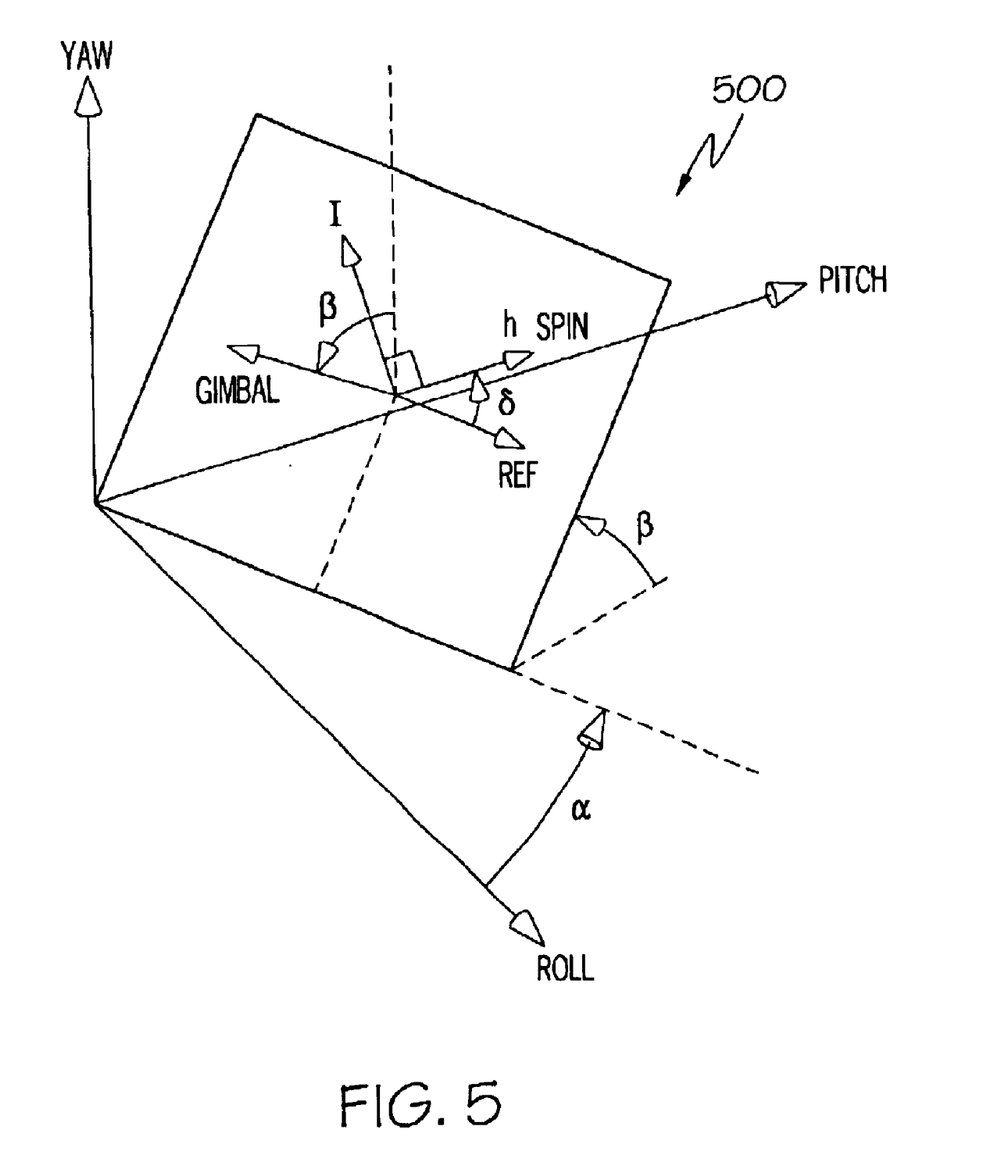
FIG. 5 is graph depicting the alignment of a flywheel with respect to a reference coordinate system within a spacecraft.

With reference now to FIG. 5, which graphically depicts the alignment of a flywheel 308 with respect to a reference coordinate system within a spacecraft, a more detailed description of the method implemented by the main controller 102 will be provided. As FIG. 5 shows, the alignment of a flywheel may be defined using the terms in the graph 500. Two of the depicted terms are variable and controllable. These two terms are gimbal angle ($\delta$) and spin rate or rotational velocity (h), and are controlled to generate a commanded amount of torque ($\Gamma$) to thereby effect both power and attitude control. The remaining terms are considered to be fixed and remain constant throughout the life of the spacecraft.

To relate gimbal angle ($\delta$) and spin rate (h) to a torque magnitude ($\Gamma$), a generally well-known transformation matrix (T) can be created that relates gimbal angle and spin rate to momentum. The Moore-Penrose pseudo-inverse of this transformation matrix ($T^{-1}$) supplies a formula for calculating the gimbal angle ($\delta$) and spin rate (h) to achieve a given momentum (I). Because torque ($\Gamma$) is the derivative of momentum (I), the gimbal angular velocities needed to achieve a commanded torque may be readily calculated. In a particular preferred embodiment, in which four flywheel systems 106 are simultaneously activated to provide integrated power and attitude control, the gimbal control block 402 in the main controller 102 generates an output matrix (X) of appropriate gimbal angular velocity commands according to the transformation shown below. It should be noted that the transformation is presented using the standard format for MATLAB®, an interactive software system developed and marketed by The Mathworks, Inc., of Natick, Mass.

$$X = B * C$$

where:

$A = [(\cos(\delta_1 + \pi/2) * \cos(\gamma_1) - \sin(\delta_1 + \pi/2) * \cos(\beta_1) * \sin(\gamma_1)) * (h_1)$ $(\cos(\delta_2 + \pi/2) * \cos(\delta_2) - \sin(\delta_2 + \pi/2) * \cos(\beta_2) * \sin(\gamma_2)) * (h_2)$ $(\cos(\delta_3 + \pi/2) * \cos(\gamma_3) - \sin(\delta_3 + \pi/2) * \cos(\beta_3) * \sin(\gamma_3)) * (h_3)$ $(\cos(\delta_4 + \pi/2) * \cos(\gamma_4) - \sin(\delta_4 + \pi/2) * \cos(\beta_4) * \sin(\gamma_4)) * (h_4);$ $(\cos(\delta_1 + \pi/2) * \sin(\gamma_1) = \sin(\delta_1 + \pi/2) * \cos(\beta_1) * \cos(\gamma_1)) * (h_1)$ $(\cos(\delta_2 + \pi/2) * \sin(\gamma_2) = \sin(\delta_2 + \pi/2) * \cos(\beta_2) * \cos(\gamma_2)) * (h_2)$ $(\cos(\delta_3 + \pi/2) * \sin(\gamma_3) = \sin(\delta_3 + \pi/2) * \cos(\beta_3) * \cos(\gamma_3)) * (h_3)$ $(\cos(\delta_4 + \pi/2) * \sin(\gamma_4) = \sin(\delta_4 + \pi/2) * \cos(\beta_4) * \cos(\gamma_4)) * (h_4);$ $(\sin(\delta_1 + \pi/2) * \sin(\beta_1) * (h_1)$ $(\sin(\delta_2 + \pi/2) * \sin(\beta_2) * (h_2)$ $(\sin(\delta_3 + \pi/2) * \sin(\beta_3) * (h_3)$ $(\sin(\delta_4 + \pi/2) * \sin(\beta_4) * (h_4)],$ B = pinv(A), and C = [Torque Command$_{x\text{-}axis}$; Torque Command$_{y\text{-}axis}$; Torque Command$_{z\text{-}axis}$].

The gimbal control loop may implement the above transformation at any one of numerous rates to meet varying system requirements. Preferably, however, gimbal control is conducted at a rate in the range of 10–100 Hz.

Similarly, the wheel speed control block 406 in the main controller 102 also generates an output matrix (Y) of appropriate flywheel acceleration commands. An exemplary transformation that may be used to generate the flywheel acceleration commands is shown below. Again, it should be noted that the transformation is presented using a standard MATLAB® format.

$$Y = E * F$$

where:

$D = [(\cos(\delta_1) * \cos(\gamma_1) - \sin(\delta_1) * \cos(\beta_1) * \sin(\gamma_1))$ $(\cos(\delta_2 + \pi/2) * \cos(\delta_2) - \sin(\delta_2) * \cos(\beta_2) * \sin(\gamma_2))$ $(\cos(\delta_3 + \pi/2) * \cos(\gamma_3) - \sin(\delta_3) * \cos(\beta_3) * \sin(\gamma_3))$ $(\cos(\delta_4 + \pi/2) * \cos(\gamma_4) - \sin(\delta_4) * \cos(\beta_4) * \sin(\gamma_4));$ $(\cos(\delta_1) * \sin(\gamma_1) = \sin(\delta_1) * \cos(\beta_1) * \cos(\gamma_1))$ $(\cos(\delta_2) * \sin(\gamma_2) = \sin(\delta_2) * \cos(\beta_2) * \cos(\gamma_2))$ $(\cos(\delta_3) * \sin(\gamma_3) = \sin(\delta_3) * \cos(\beta_3) * \cos(\gamma_3))$ $(\cos(\delta_4) * \sin(\gamma_4) = \sin(\delta_4) * \cos(\beta_4) * \cos(\gamma_4));$ $(\sin(\delta_1) * \sin(\beta_1)$ $(\sin(\delta_2) * \sin(\beta_2)$ $(\sin(\delta_3) * \sin(\beta_3)$ $(\sin(\delta_4) * \sin(\beta_4)],$ E = pinv(A), and F = [Predicted Torque$_{x\text{-}axis}$; Predicted Torque$_{y\text{-}axis}$; Predicted Torque$_{z\text{-}axis}$]

As with the gimbal control loop, the wheel speed control loop may implement the above transformation at any one of numerous rates to meet varying system requirements. Preferably, however, wheel speed control is conducted at a rate in the range of 4–12 kHz.

The system and method described above allows a plurality of flywheels to be controlled in a manner that provides integrated power and attitude control without generating unwanted torque during combined maneuvers and power surges. Thus, accurate and smooth attitude control is readily achieved.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An integrated power and attitude control system, comprising:
   a controller coupled to receive at least a torque command signal and a power command signal and operable, in response thereto, to supply (i) a gimbal angular velocity command based at least in part on the torque command signal and (ii) a flywheel acceleration command based at least in part on the torque command signal and the power command signal; and
   a flywheel system coupled to receive the gimbal angular velocity command and the flywheel acceleration command from the controller and operable, in response thereto, to (i) move at the commanded gimbal angular velocity on a gimbal axis and (ii) accelerate at the commanded flywheel acceleration on a spin axis.

2. The system of claim 1, wherein the flywheel system is further operable to supply a gimbal angular velocity feedback signal, and wherein the controller comprises:
   a torque prediction circuit coupled to receive the gimbal angular velocity feedback signals from each energy storage flywheel system and operable, in response thereto, to supply a predicted torque output signal;
   a comparator circuit coupled to receive the torque command signal and the predicted torque output signal and operable, in response thereto, to supply a torque control input signal; and
   a speed control circuit coupled to receive the torque control input signal and the power command signal and operable, in response thereto, to supply the flywheel acceleration command.

3. The system of claim 1, wherein the controller comprises:
   a gimbal control circuit coupled to receive the torque command signal and operable, in response thereto, to supply the gimbal angular velocity command.

4. The system of claim 1, wherein the flywheel system further includes:
   one or more magnetic bearings rotationally mounting the flywheel system; and
   a magnetic bearing controller coupled to receive bearing command signals and operable, in response thereto, to supply position control signals to each of the magnetic bearings.

5. The system of claim 1, wherein each flywheel system further includes:
   a motor/generator coupled to the flywheel system to supply rotational energy to, and receive rotational energy from, the flywheel system; and
   a motor/generator controller coupled to receive the flywheel acceleration command and operable, in response thereto, to supply operational control signals to the motor/generator to thereby accelerate the flywheel system.

6. The system of claim 1, wherein each flywheel system is mounted in a gimbal frame, and wherein the system further comprises:
   one or more actuators coupled to receive the gimbal angular velocity command signal from the controller and operable, in response thereto, to move the gimbal frame to the gimbal angle at the commanded angular velocity.

7. The system of claim 1, wherein the controller and flywheel system are each mounted within a vehicle, and wherein the system further comprises:
   an attitude sensor mounted within the vehicle and adapted to sense an attitude of the vehicle relative to a reference, the attitude sensor supplying a position feedback signal to the controller,
   wherein the controller is responsive to the position feedback signal to thereby adjust at least the gimbal angular velocity command signal to achieve the commanded torque.

8. The system of claim 7, wherein:
   the vehicle has multiple degrees of freedom;
   the controller is operable to supply independent gimbal angular velocity commands and independent flywheel acceleration commands for at least each of the vehicle degrees of freedom; and
   the system further comprises:
      a plurality of flywheel systems, each flywheel system coupled to receive one of the independent gimbal angular velocity commands and one of the independent flywheel acceleration commands.

9. The system of claim 8, wherein the system comprises four or more flywheel systems.

10. The method of controlling the relative attitude and rotational speed of a flywheel, comprising:
    receiving a torque command signal and a power command signal;
    supplying a gimbal angular velocity command based at least in part on the torque command;
    supplying a rotational acceleration command based at least in part on the torque command signal and the power command signal;
    moving the flywheel at the commanded gimbal angular velocity on a gimbal axis; and
    rotationally accelerating the flywheel at the commanded rotational acceleration on a spin axis.

11. The method of claim 10, further comprising:
    supplying a gimbal angular velocity feedback signal from the flywheel;
    supplying a predicted torque output signal based at least in part on the gimbal angular velocity feedback signal;
    comparing the predicted torque output signal to the torque command signal and, based at least in part thereon, supplying a torque control input signal; and
    supplying the rotational acceleration command based at least in part on the torque control input signal and the power command signal.

12. The method of claim 10, wherein the flywheel is mounted within a vehicle, and wherein the method further comprises:
    supplying a vehicle position feedback signal based on a sensed attitude of the vehicle relative to a reference; and
    adjusting at least the gimbal angular velocity command signal in response to the position feedback signal to thereby to achieve the commanded torque.

13. A satellite, comprising:
    a controller coupled to receive at least a torque command signal and a power command signal and operable, in response thereto, to supply (i) one or more independent gimbal angular velocity commands based at least in part on the torque command signal and (ii) one or more independent flywheel acceleration commands based at least in part on the torque command signal and the power command signal; and a plurality of energy storage flywheel systems, each flywheel system coupled to receive one of the gimbal angular velocity commands and one of the flywheel acceleration commands from the controller and operable, in response thereto, to (i) move on a gimbal axis at the commanded gimbal angular velocity it received and (ii) accelerate on a spin axis at the commanded flywheel acceleration it received.

* * * * *

UNITED STATES PATENT AND TRADEMARK OFFICE
CERTIFICATE OF CORRECTION

PATENT NO. : 6,779,759 B1
APPLICATION NO. : 10/402493
DATED : August 24, 2004
INVENTOR(S) : Klupar et al.

It is certified that error appears in the above-identified patent and that said Letters Patent is hereby corrected as shown below:

Column 1, add the following paragraph between the Title and Technical Field:

--STATEMENT REGARDING FEDERALLY SPONSORED RESEARCH OR DEVELOPMENT

This invention was made with government support under Agreement No. F29601-01-2-0046 awarded by the U.S. Air Force, Air Force Research Laboratory. The government has certain rights in this invention.--

Signed and Sealed this

Twentieth Day of March, 2007

JON W. DUDAS
*Director of the United States Patent and Trademark Office*